United States Patent
Khan et al.

(10) Patent No.: US 12,298,964 B2
(45) Date of Patent: May 13, 2025

(54) SYSTEMS AND METHODS FOR SECURE CROSS-LEDGER RECORDATION

(71) Applicant: Verizon Patent and Licensing Inc., Basking Ridge, NJ (US)

(72) Inventors: Ahmed A. Khan, Plano, TX (US); Mohammed Alsadi, Redmond, WA (US); Jeaha Yang, Darien, CT (US); Rangesh Sripathi, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 18 days.

(21) Appl. No.: 18/183,230

(22) Filed: Mar. 14, 2023

(65) Prior Publication Data
US 2024/0311368 A1    Sep. 19, 2024

(51) Int. Cl.
*G06F 16/23* (2019.01)
(52) U.S. Cl.
CPC ...... *G06F 16/2379* (2019.01); *G06F 16/2365* (2019.01)
(58) Field of Classification Search
CPC .................................................. G06F 16/2379
USPC ....................................................... 707/791
See application file for complete search history.

(56) References Cited

U.S. PATENT DOCUMENTS 11,216,773 B1 *   1/2022  Griggs ............... G06Q 10/0833
2020/0136807 A1 * 4/2020  Thompson .............. G06F 16/27

FOREIGN PATENT DOCUMENTS

CN    114782045 A  *  7/2022

OTHER PUBLICATIONS

ConsenSys, "ConsenSys Quorum (Home page)," consensys.net, available at https://consensys.net/quorum/, visited Feb. 2, 2023.
R3, "Corda; Leading Platform for Regulated Industries (Home page)," corda.net, available at https://corda.net/, visited Feb. 2, 2023.

* cited by examiner

*Primary Examiner* — Syling Yen

(57) ABSTRACT

A system described herein may receive a cross-ledger recordation request that includes an information payload, an indication of a target distributed ledger to which the information payload should be recorded, and an indication of a second distributed ledger to which a reference that refers to the first distributed ledger should be recorded. The system may provide the information payload to a second system that implements the first distributed ledger. The system may determine that at least a portion of the information payload has been recorded to the first distributed ledger based on providing the information payload to the second system that implements the first distributed ledger. Based on determining that at least the portion of the information payload has been recorded to the second distributed ledger, the system may record the reference, that refers to the first distributed ledger, to the second distributed ledger.

20 Claims, 14 Drawing Sheets

SYSTEMS AND METHODS FOR SECURE CROSS-LEDGER RECORDATION

BACKGROUND

Distributed ledgers, such as blockchains, provide for the decentralized and secure storage of data. Distributed ledgers may further provide for the immutability of recorded data, as data may not be altered once recorded to a distributed ledger. Nodes associated with a distributed ledger may be implemented by hardware resources that are independent of each other, geographically distributed, and/or otherwise separate. A distributed ledger framework may implement, manage, etc. one or more distributed ledgers and/or nodes that implement such distributed ledgers. Different distributed ledger frameworks may utilize varied protocols or other techniques to implement distributed ledgers or nodes.

DETAILED DESCRIPTION OF EXAMPLE EMBODIMENTS

The following detailed description refers to the accompanying drawings. The same reference numbers in different drawings may identify the same or similar elements.

Embodiments described herein provide for the interoperability of multiple distributed ledgers. For example, as discussed herein, a cross-ledger recordation request, received via a first system associated with a first distributed ledger, may be used to initiate the creation of one or more records at a second distributed ledger (e.g., maintained by a second system). The first distributed ledger may record a reference to the created records at the second distributed ledger, such that entities that have access to the first distributed ledger (e.g., read access, view access, etc.) may be able to ascertain that one or more records have been created at the second distributed ledger, and may further be able to verify the records created at the second distributed ledger.

Figure 1:
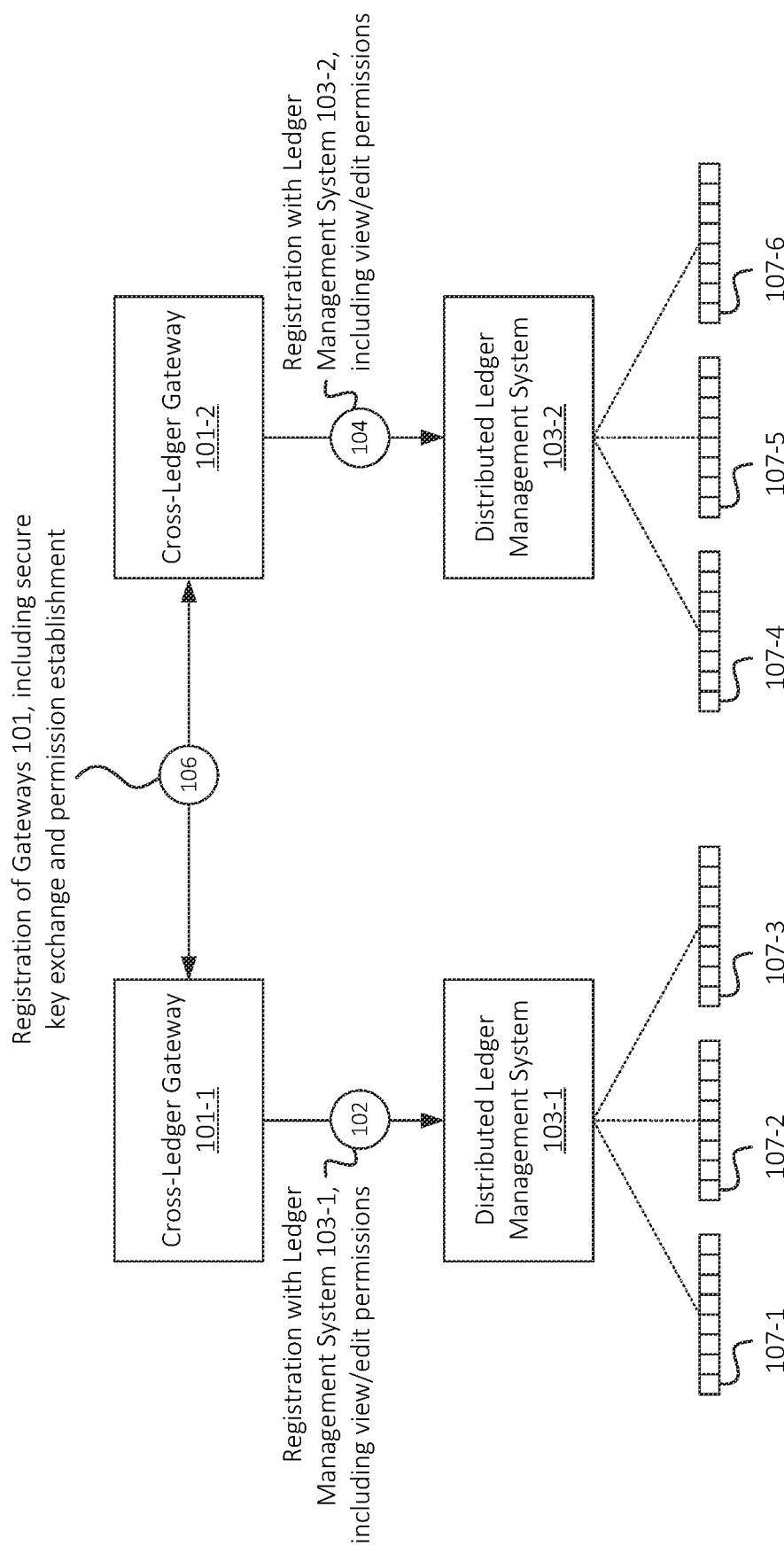
FIG. 1 illustrates an example registration procedure, in accordance with some embodiments.

As shown in FIG. 1, a first Cross-Ledger Gateway ("CLG") 101-1 may register (at 102) with a first Distributed Ledger Management System ("DLMS") 103-1. Additionally, a second CLG 101-2 may register (at 104) with a second DLMS 103-2. DLMSs 103-1 and 103-2 may be, for example, associated with different distributed ledger frameworks (e.g., DLMS 103-1 may be associated with a Hyperledger Fabric ("HLF") framework and DLMS 103-2 may be associated with a ConsenSys Quorum framework, an R3 Corda framework, etc.). Additionally, or alternatively, DLMSs 103-1 and 103-2 may be associated with the same distributed ledger framework (e.g., DLMS 103-1 may be associated with a first entity and/or may implement one or more distributed ledgers via a first set of devices and DLMS 103-2 may be associated with a second entity and/or may implement one or more distributed ledgers via a second set of devices). As discussed below, registering with a given DLMS 103 may allow for CLG 101 to facilitate cross-ledger recordation of information. Further, in some embodiments, registering with a given DLMS 103 may allow for CLG 101 to provide access to one or more distributed ledgers associated with the given DLMS 103 to one or more other devices or systems, such as client applications, decentralized applications ("dApps"), etc.

DLMSs 103 (e.g., DLMSs 103-1 and DLMS 103-2) may, as mentioned above, manage or maintain a set of nodes that maintain one or more distributed ledgers 107. In this sense, DLMSs 103 may be considered as managing, implementing, or otherwise being associated with such distributed ledgers 107. For example, as shown, DLMS 103-1 may manage a first set of distributed ledgers 107-1, 107-2, and 107-3, while DLMS 103-2 may manage a second set of distributed ledgers 107-4, 107-5, and 107-6.

Figure 2:
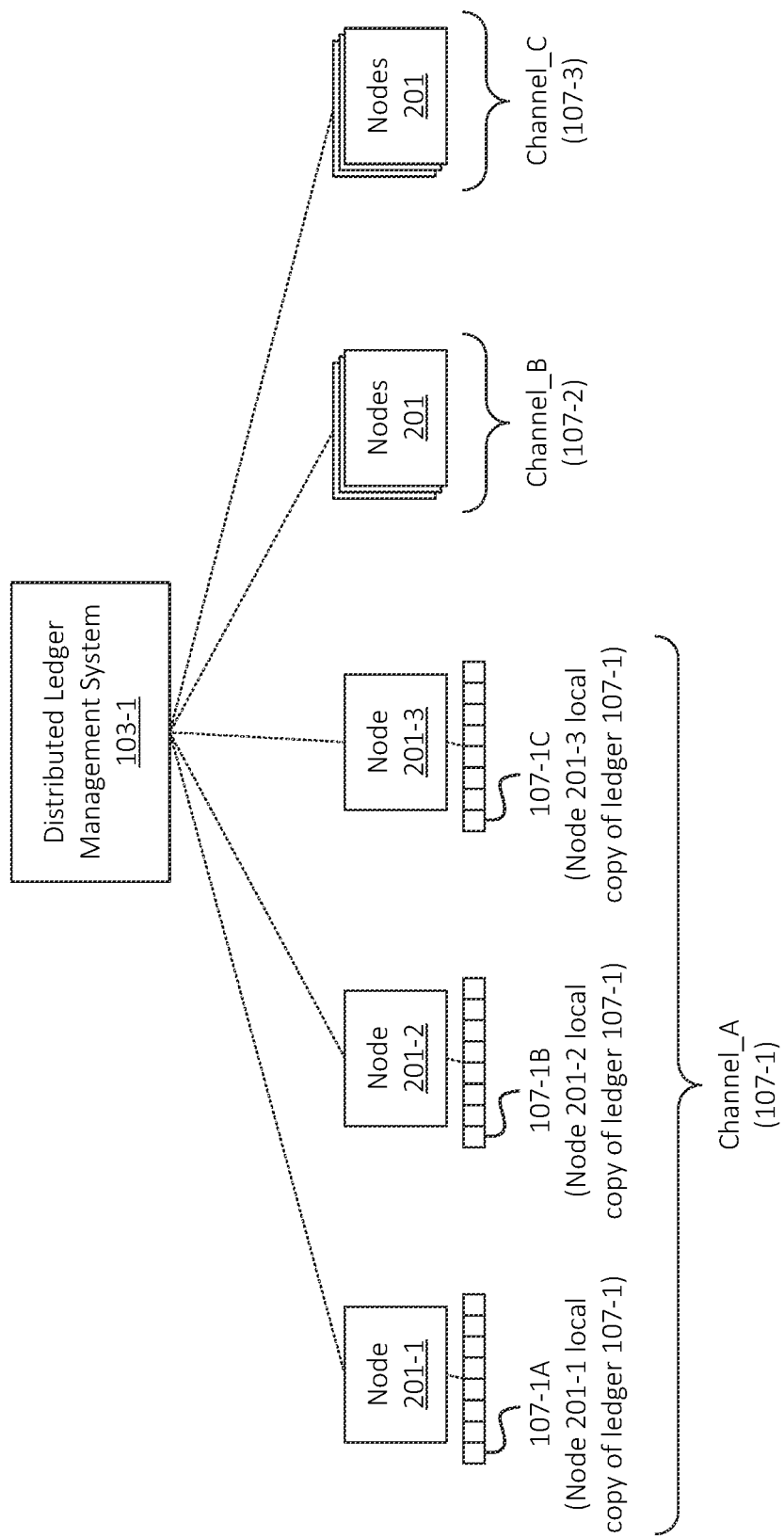
FIG. 2 illustrates an example of one or more channels associated with a distributed ledger management system, in accordance with some embodiments.

FIG. 2 illustrates an example of the management of distributed ledgers 107 by a given DLMS 103 (e.g., the management of distributed ledgers 107-1, 107-2, and 107-3 by DLMS 103-1). A given DLMS 103 may implement, may configure, may be communicatively coupled to, and/or may otherwise be associated with multiple nodes 201. A particular node 201 may be, for example, a particular device, a particular container, a particular instance, etc. that performs one or more operations to maintain a respective distributed ledger 107 and/or perform other operations as defined by a given distributed ledger framework (e.g., as instructed or configured by a respective DLMS 103). Such operations may include recording new entries to a respective distributed ledger 107, providing copies of distributed ledger 107 in response to queries, validating entries proposed to be recorded to distributed ledger 107, and/or other suitable operations. DLMS 103 may implement, may configure, or may otherwise be associated with an orchestration and/or containerization system (e.g., the open source Kubernetes API or other suitable API or system) that configures, provisions, instantiates, etc. nodes 201.

In the example of FIG. 2, DLMS 103-1 may configure, may implement, and/or may otherwise be communicatively coupled to nodes 201-1, 201-2, 201-3, and/or other nodes 201 that implement, maintain, etc. distributed ledgers 107 managed by DLMS 103-1 (e.g., distributed ledgers 107-1, 107-2, and 107-3). A respective set of nodes 201 that maintain a particular distributed ledger 107 may be referred to as a "channel." Additionally, or alternatively, the term "channel" may refer to or otherwise be associated with an association between a respective set of nodes 201 and the particular distributed ledger 107 maintained by such nodes 201. In this example, nodes 201-1, 201-2, and 201-3 may maintain distributed ledger 107-1, and may accordingly be associated with a first channel ("Channel_A"). Similarly, another set of nodes 201, managed by DLMS 103-1, may maintain distributed ledger 107-2 and may accordingly be associated with a second channel ("Channel_B"), and yet another set of nodes 201 managed by DLMS 103-1 may maintain distributed ledger 107-3 and may accordingly be associated with a third channel ("Channel_C").

Nodes 201 may maintain local copies of a respective distributed ledger 107. For example, node 201-1 may maintain a respective local copy 107-1A of distributed ledger 107-1, node 201-2 may maintain a respective local copy 107-1B of distributed ledger 107-1, and node 201-3 may maintain a respective local copy 107-1C of distributed ledger 107-1. Nodes 201 of the same channel (e.g., maintaining the same distributed ledger 107) may communicate with each other in order to ensure that the respective local copies of such distributed ledger 107 are identical, thus preserving the integrity of such distributed ledger 107.

DLMS 103-1 may serve as ingress and/or point, router, etc. with respect to respective distributed ledgers 107 and/or associated channels. For example, DLMS 103-1 may receive information to be recorded to a particular distributed ledger 107, may identify one or more nodes 201 or channels associated with such distributed ledger 107, and may provide the information to such identified nodes 201 and/or channels. The identified nodes 201 may perform operations related to recording the information to the particular distributed ledger 107, such as cross-validating the information, cross-validating local copies of distributed ledger 107, etc. Similarly, DLMS 103-1 may provide access to authorized entities to view, access, etc. a given distributed ledger 107 (e.g., one or more distributed ledgers 107 may be "permissioned" distributed ledgers 107 that are only accessible by authorized entities), and may restrict access from unauthorized entities.

Returning to FIG. 1, the registration (e.g., at 102 and/or 104) of a given CLG 101 with a respective DLMS 103 may include establishing permissions for respective CLGs 101 to access respective distributed ledgers 107 managed by DLMSs 103-1 and 103-2. Such permissions may include "view" permissions, "edit" permissions, and/or other suitable permissions. Edit permissions may include, for example, the ability to propose new entries to respective distributed ledgers 107, adding distributed ledgers 107 to a particular DLMS 103, or the like. Further, the registration of CLGs 101-1 and 101-2 with DLMSs 103-1 and 103-2 may include the exchange or providing of authentication information, such as one or more keys, authentication tokens, passwords, or the like, which may be used by DLMSs 103-1 and 103-2 to authenticate CLGs 101-1 and/or 101-2, respectively (e.g., to authenticate requests, instructions, etc. from CLGs 101-1 and/or 101-2).

Figure 3:
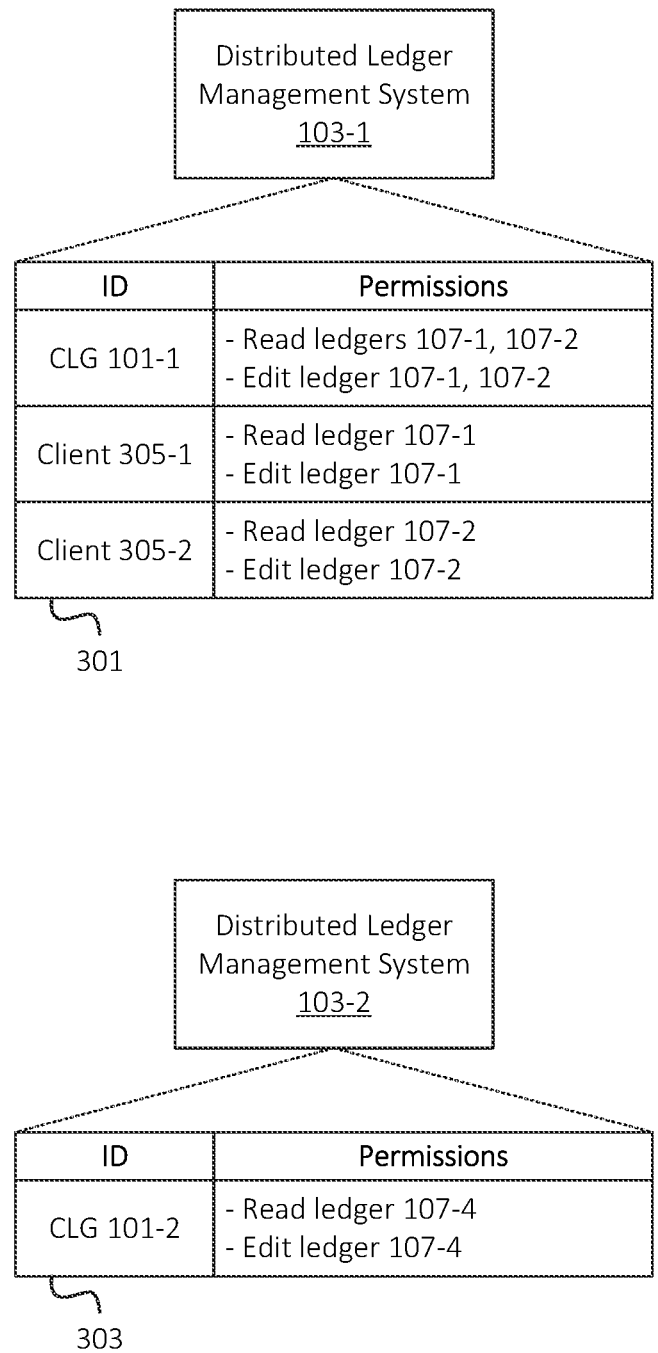
FIGS. 3 and 4 illustrate examples of permission information, in accordance with some embodiments.

As such, DLMSs 103 may maintain respective permissions, authorization information, authentication information, etc. for one or more devices or systems. DLMSs 103 may utilize such information to provide access to respective distributed ledgers 107 in accordance with permissions associated with different devices or systems. FIG. 3 illustrates example data structures 301 and 303 that may be maintained by DLMSs 103-1 and 103-2, respectively, that indicates such permissions and/or authorization information. As shown, for example, DLMS 103-1 may maintain data structure 301, indicating permissions associated with three example entities: CLG 101-1, a first client 305-1, and a second client 305-2. Data structure 301 may include identifiers associated with such entities, such as an Internet Protocol ("IP") address, a device identifier, a user name, and/or other suitable identifiers. As noted above, each entity may be associated with different permissions to access, edit, etc. respective distributed ledgers 107 managed by DLMS 103-1. The permissions may have been established during respective registrations of these entities with DLMS 103-1 and/or in some other suitable manner.

For example, CLG 101 may be associated (e.g., based on the registration at 102) with permissions to read and edit distributed ledgers 107-1 and 107-2 (e.g., may be restricted from reading and/or editing distributed ledger 107-3). Additionally, client 305-1 may have permission to read and edit distributed ledger 107-1, and client 305-2 may have permission to read and edit distributed ledger 107-2. As shown in data structure 303, CLG 101-2 may have permission (e.g., based on the registration at 104) to read and edit distributed ledger 107-4. Although example permissions, for access to respective distributed ledgers 107 associated with DLMSs 103-1 and 103-2, are discussed above, in practice additional devices or systems may have additional or different permission to access respective distributed ledgers 107 associated with DLMSs 103-1 and 103-2.

Returning to FIG. 1, CLGs 101-1 and 101-2 may participate (at 106) in a registration procedure. The registration procedure (at 106) between CLGs 101-1 and 101-2 may include exchanging authentication information, such as generating and/or providing one or more public and/or private keys, performing a Diffie-Helman key exchange, providing and/or receiving keys via a key escrow server, and/or establishing one or more other suitable authentication mechanisms by which CLG 101-1 may authenticate communications from CLG 101-2, and/or by which CLG 101-2 may authenticate communications from CLG 101-1.

The registration procedure (at 106) between CLGs 101-1 and 101-2 may also include establishing respective permissions associated with CLGs 101-1 and/or 101-2. For example, CLG 101-1 may provide permissions to CLG 101-2, based on permissions granted by DLMS 103-1 to CLG 101-1. That is, in some embodiments, the permissions granted to CLG 101-2 by CLG 101-1 may be a subset of the permissions granted by DLMS 103-1 to CLG 101-1. In some embodiments, CLG 101-1 may grant all permissions, granted by DLMS 103-1, to CLG 101-2. Similarly, CLG 101-2 may provide permissions to CLG 101-1, based on permissions granted by DLMS 103-2 to CLG 101-2. That is, in some embodiments, the permissions granted to CLG 101-1 by CLG 101-2 may be a subset of the permissions granted by DLMS 103-2 to CLG 101-2, and/or may include all permissions granted by DLMS 103-2 to CLG 101-2.

Figure 4:
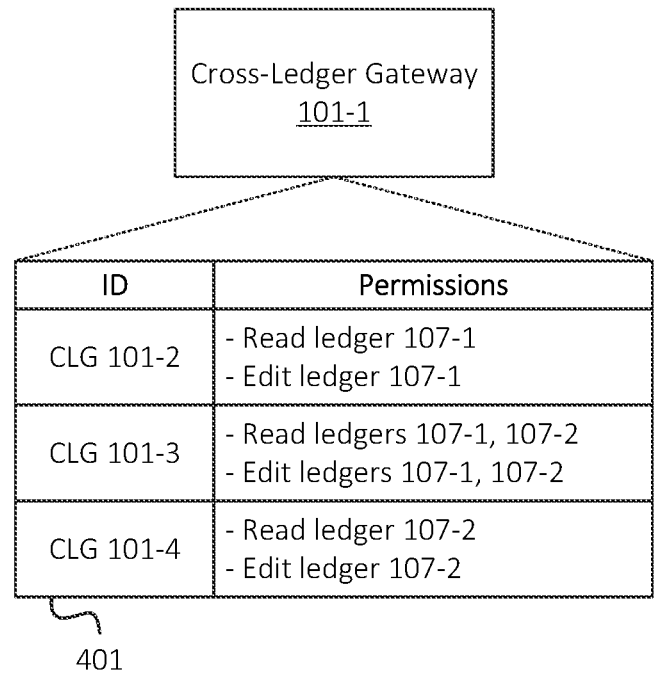
Figure 4:
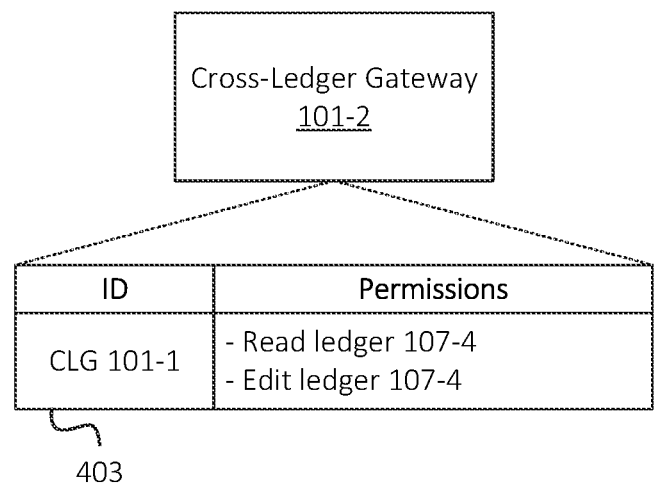

FIG. 4 illustrates example data structures 401 and 403, which may be maintained or otherwise utilized by CLGs 101-1 and 101-2, respectively. Data structure 401 includes example permission information as maintained or otherwise associated with CLG 101-1, and data structure 403 includes example permission information as maintained or otherwise associated with CLG 101-2. As shown, for example, data structure 401 indicates that CLG 101-2 is authorized to read and edit distributed ledger 107-1, that another CLG 101 (e.g., CLG 101-3) is authorized to read and edit distributed ledgers 107-1 and 107-2, and that yet another CLG 101 (e.g., CLG 101-4) is authorized to read and edit distributed ledger 107-2. As discussed above, the permissions granted by CLG 101-1 to respective CLGs 101-2, 101-3, and 101-4 (as indicated in data structure 401) may be a subset of permissions granted to CLG 101-1 (e.g., by DLMS 103-1). As further shown, data structure 403 indicates that CLG 101-1 is authorized to read and edit distributed ledger 107-4, which may be a subset of or otherwise based on permissions granted to CLG 101-2 by DLMS 103-2. Generally, as discussed below, the permissions granted by one CLG 101 to another (e.g., by CLG 101-1 to 101-2 or vice versa) may facilitate the cross-ledger recordation of data or other types of access.

In some embodiments, CLGs 101 may maintain additional permission information, such as information indicating which entities are authorized to access which distributed ledgers 107. For example, DLMS 103-1 may provide some or all of data structure 301 to CLG 101-1, indicating particular distributed ledgers 107 of DLMS 103-1 that other entities are authorized to access. In this example, CLG 101-1 may maintain information indicating that client 305-1 is authorized to read and edit distributed ledger 107-1, and that client 305-2 is authorized to read and edit distributed ledger 107-2. Such information may be used by DLMS 103-1 to determine that requests to access respective distributed ledgers 107 (e.g., read requests, edit requests, cross-ledger recordation requests, etc.) are authorized.

Figure 5:
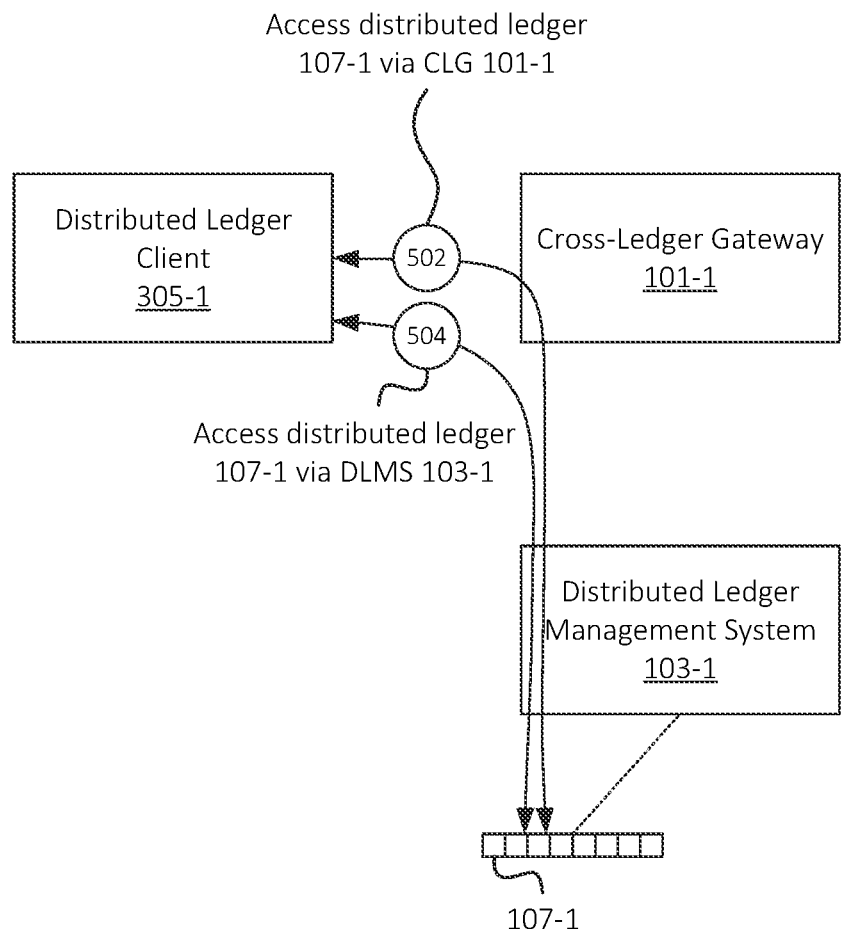
FIG. 5 illustrates an example of accessing a particular distributed ledger by a client, in accordance with some embodiments.

For example, as shown in FIG. 5, CLG 101-1 may provide (at 502) access to distributed ledger 107-1 to client 305-1. As part of the access (at 502), CLG 101-1 may determine that client 305-1 has permission (e.g., is authorized) to access (e.g., read, edit, etc.) distributed ledger 107-1, which may be based on permission information provided to CLG 101-1 by DLMS 103-1, as discussed above. Further, as part of the access (at 502), DLMS 103-1 may determine that CLG 101-1 is authorized to access distributed ledger 107-1. The access (at 502) via CLG 101-1 may include client 305-1 communicating with CLG 101-1 via an application programming interface ("API"), web portal, or other suitable communication pathway between client 305-1 (e.g., a device or system executing or implementing client 305-1) and CLG 101-1 (e.g., a device or system executing or implementing CLG 101-1).

Client 305-1 may also access (at 504) distributed ledger 107-1 via DLMS 103-1. As part of the access (at 504), DLMS 103-1 may determine that client 305-1 has permission to access distributed ledger 107-1, which may be indicated in data structure 301, as discussed above. As further noted above, although DLMS 103-1 may maintain other distributed ledgers 107 (e.g., distributed ledgers 107-2, 107-3, etc.), client 305-1 may not be authorized to access such other distributed ledgers 107, as indicated in data structure 301.

Figure 6:
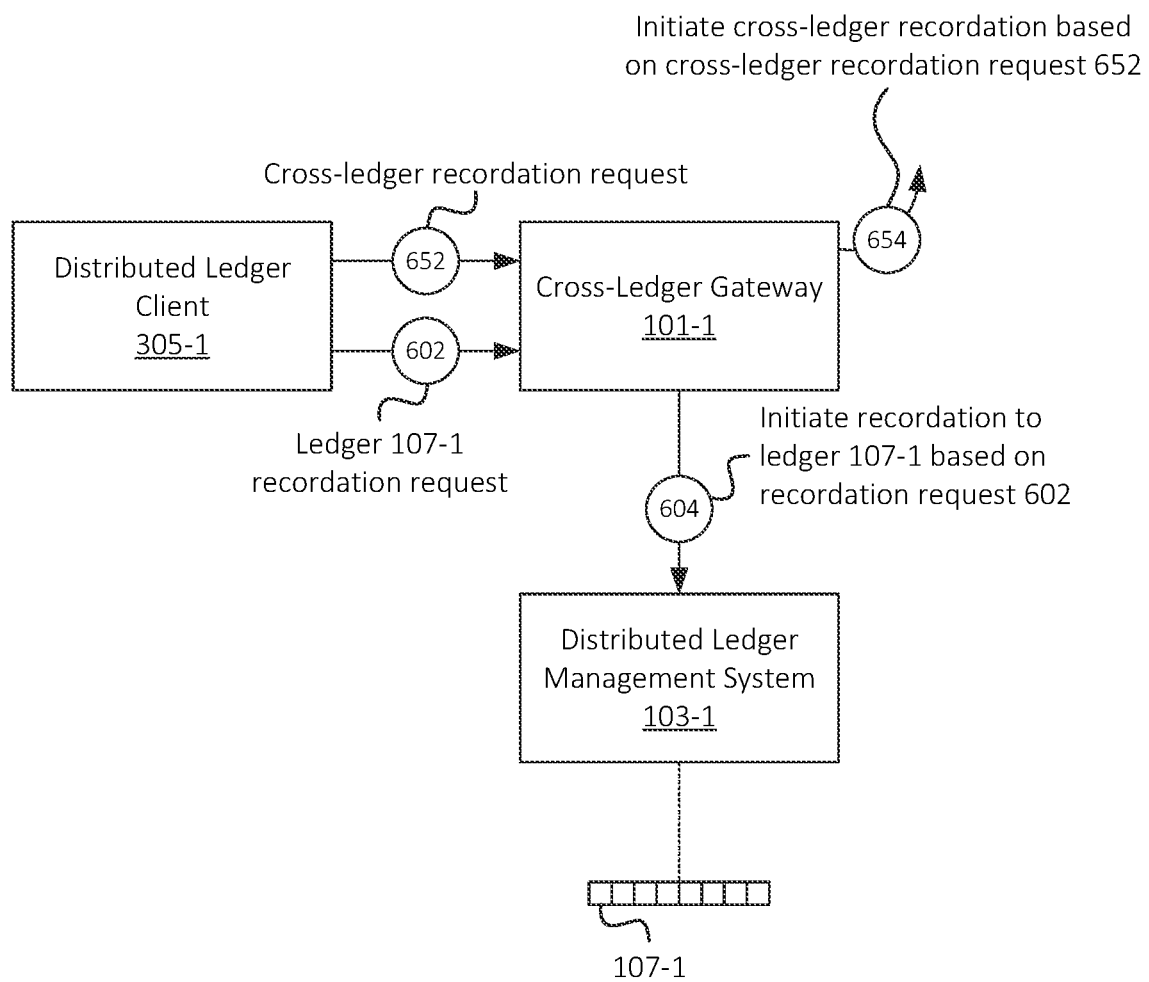
FIGS. 6-8 illustrate examples of receiving a cross-ledger recordation request, in accordance with some embodiments.
Figure 7:
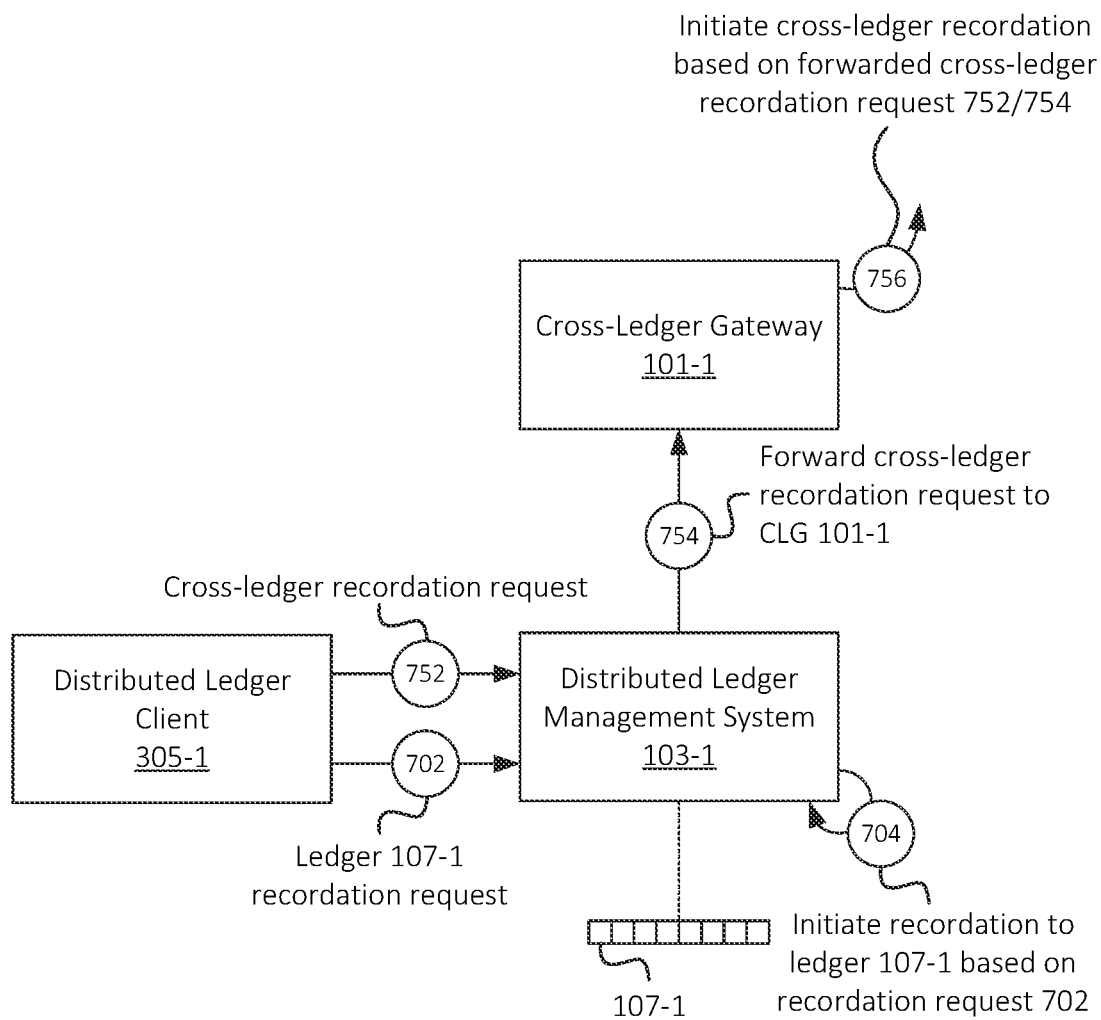
Figure 8:
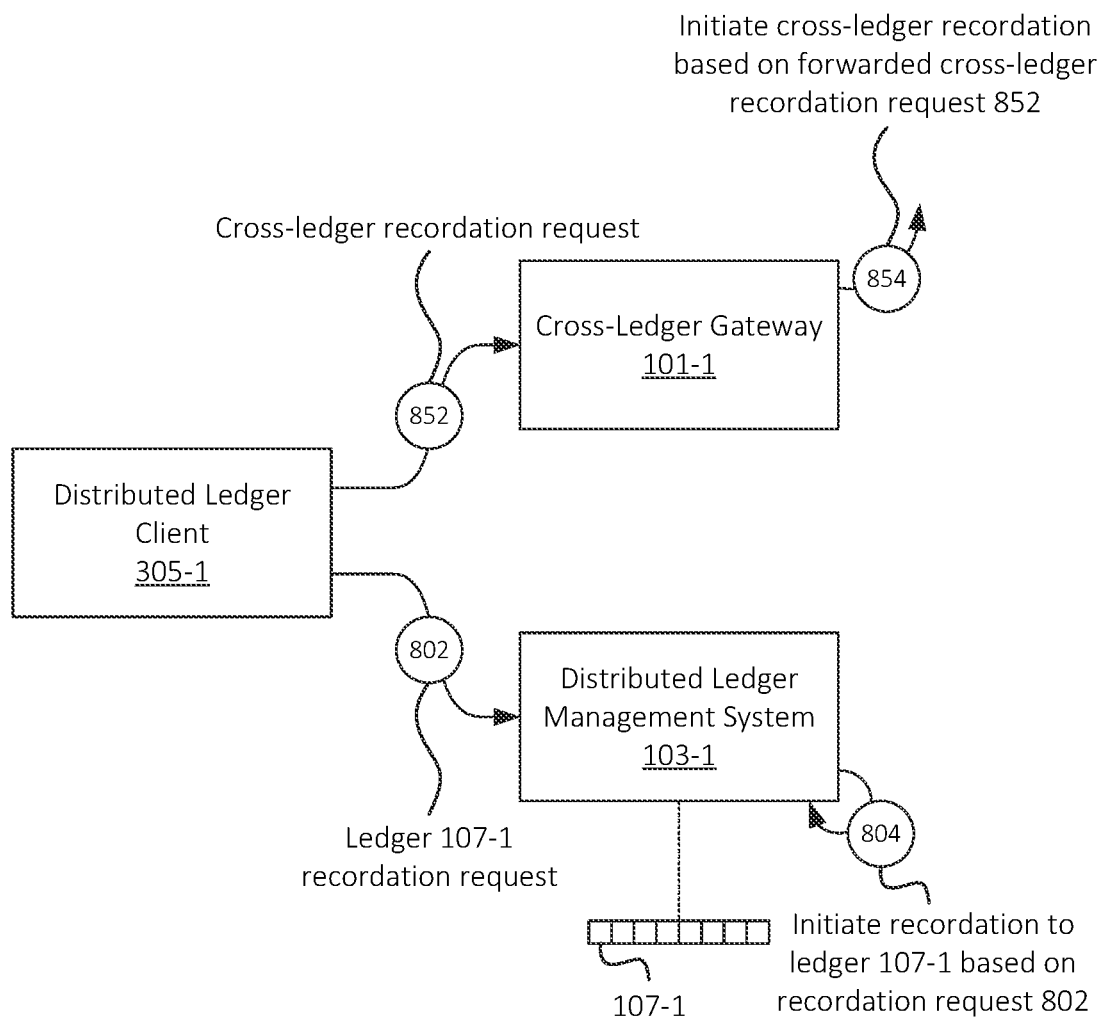

The access (e.g., at 502 and/or 504) of a particular distributed ledger 107 (e.g., distributed ledger 107-1) by a particular device or system (e.g., client 305-1 or some other suitable entity) may include requests to edit the particular distributed ledger 107. Such edits may include recordation of information to a first particular distributed ledger 107, and/or a cross-ledger recordation request (e.g., the recordation of information to a second distributed ledger 107, as well as a recordation of the cross-ledger recordation to the first distributed ledger 107). FIGS. 6-8 illustrate examples of such requests.

For example, as shown in FIG. 6, client 305-1 may output (at 602) a request to record information to distributed ledger 107-1. In some embodiments, the request (at 602) may include an identifier of DLMS 103-1 and/or distributed ledger 107-1, based on which CLG 101-1 may determine that the request (at 602) is associated with DLMS 103-1 and/or distributed ledger 107-1. The requested information may include, for example, asset information (e.g., creation, transfer, deletion, deposit, wrapping, modification, etc. of an asset such as a non-fungible token ("NFT"), a crypto asset, etc.) or other types of information to be recorded to distributed ledger 107-1.

As discussed above, CLG 101-1 may determine that client 305-1 is authorized to access (e.g., edit) distributed ledger 107-1. Assuming that that CLG 101-1 determines that client 305-1 is authorized to access distributed ledger 107-1, CLG 101-1 may initiate (at 604) a recordation of the requested information to distributed ledger 107-1 by communicating with DLMS 103-1 (e.g., via an API or other suitable communication pathway) to initiate the recordation to distributed ledger 107-1. The request (at 604) may include an identifier of client 305-1, an identifier of CLG 101-1, an identifier of distributed ledger 107-1, and/or some other suitable information based on which DLMS 103-1 may determine that the request (at 604) includes a request to record information to distributed ledger 107-1.

In some embodiments, DLMS 103-1 may determine whether CLG 101-1 and/or client 305-1 is/are authorized to edit (e.g., record information to) distributed ledger 107-1, such as based on permission information indicated in data structure 301. Assuming that DLMS 103-1 determines that CLG 101-1 and/or client 305-1 is/are authorized to record the requested information to distributed ledger 107-1, DLMS 103-1 may record such information to distributed ledger 107-1. For example, as discussed above, DLMS 103-1 may provide the requested information to one or more nodes 201 that maintain distributed ledger 107-1, which may perform suitable consensus techniques or other secure techniques to update respective local copies of distributed ledger 107-1 based on the provided information. Thus, after the recordation, distributed ledger 107-1 may include one or more new records that include the requested information (e.g., a payload of the one or more records) as well as metadata associated with the recordation (e.g., a time of the request provided (at 602) by client 305-1, a time of the request provided (at 604) by CLG 101-1, a time that DLMS 103-1 received (at 604) the request, an identifier of client 305-1 and/or CLG 101-1, a pointer to a previous record of distributed ledger 107-1, etc.).

As also shown in FIG. 6, client 305-1 may also output (at 652) a cross-ledger recordation request to CLG 101-1. The cross-ledger recordation request may include, for example, an identifier of a target distributed ledger 107 and/or a target DLMS 103 (e.g., a particular distributed ledger 107 and/or DLMS 103 to which particular information should be recorded) as well as a source distributed ledger 107 and/or a source DLMS 103 (e.g., a particular distributed ledger 107 and/or DLMS 103 to which a record, pointer, link, indicator, etc. of the cross-ledger recordation should be recorded).

Figure 9:
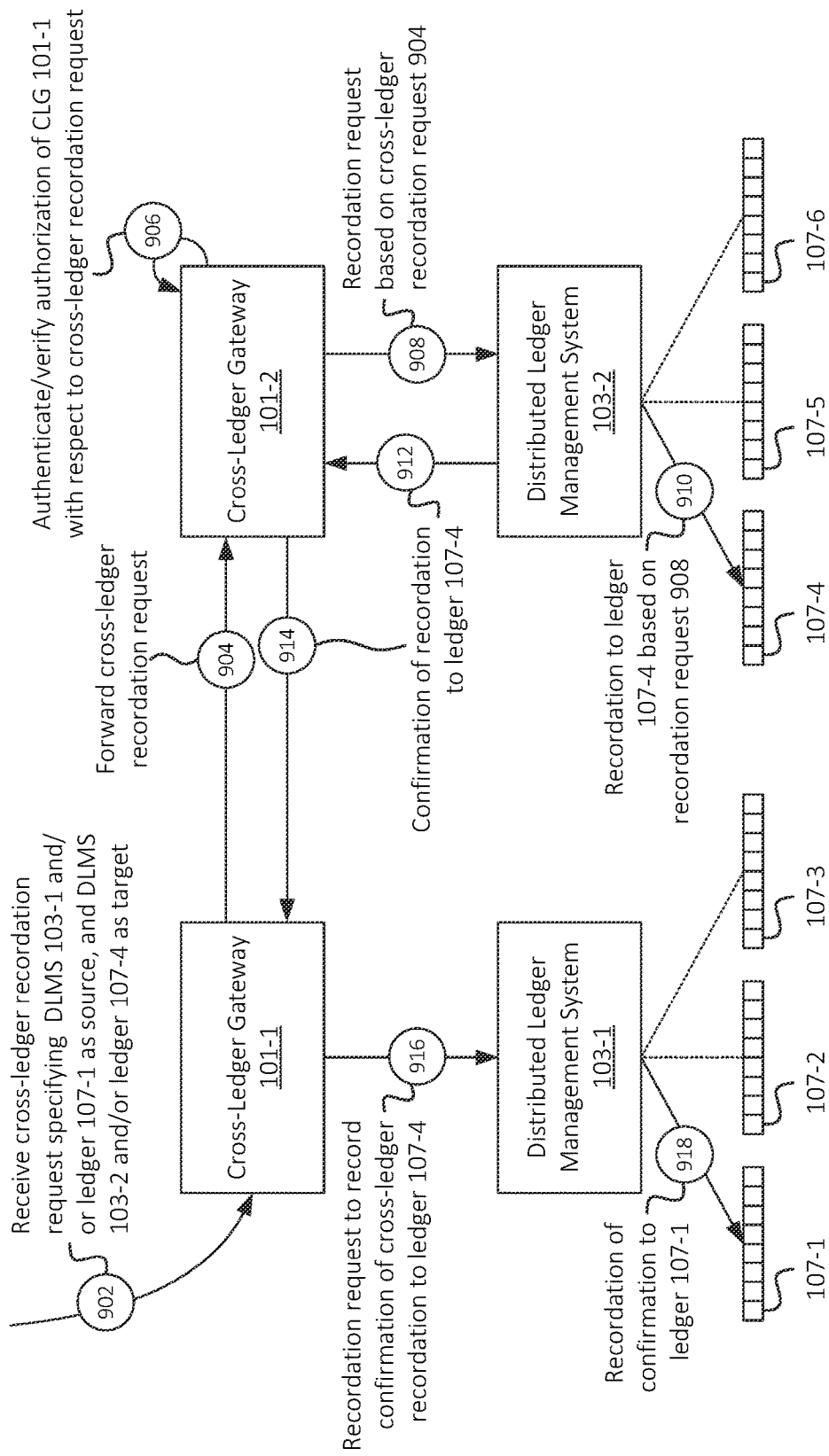
FIG. 9 illustrates an example of performing a cross-ledger recordation procedure, in accordance with some embodiments.

In this example, assume that distributed ledger 107-1 is the source distributed ledger associated with the cross-ledger recordation request (at 652). As similarly noted above, CLG 101-1 may verify that client 305-1 is authorized to edit distributed ledger 107-1, which may include edits pertaining to cross-ledger recordation requests. Assuming that client 305-1 is authorized to make the cross-ledger recordation request with distributed ledger 107-1 as the source distributed ledger (e.g., assuming that client 305-1 is authorized to edit distributed ledger 107-1), CLG 101-1 may initiate (at 654) a cross-ledger recordation request on the request (at 652). FIG. 9, discussed below, provides an example cross-ledger recordation procedure in which distributed ledger 107-4 (e.g., associated with DLMS 103-2) is the target distributed ledger 107 and distributed ledger 107-1 (e.g., associated with DLMS 103-1) is the source distributed ledger 107.

FIG. 7 illustrates another example embodiment of handling ledger recordation requests and/or cross-ledger recordation requests from a particular client 305. In the example of FIG. 6, CLG 101-1 receives requests (e.g., at 602 and 652) from client 305-1, and determines whether the requests should be forwarded to DLMS 103-1 (e.g., recordation requests for distributed ledger 107-1) or to another entity (e.g., cross-recordation requests for which distributed ledger 107-1 is a source distributed ledger). In FIG. 7, DLMS 103-1 may make such determinations. For example, as shown, DLMS 103-1 may receive (at 702) a request to record information to distributed ledger 107-1. Client 305-1 may communicate with DLMS 103-1 via an API, an application, a web portal, or other suitable communication pathway. Assuming that DLMS 103-1 determines that client 305-1 is authorized to record information to distributed ledger 107-1 (e.g., based on information in data structure 301), DLMS 103-1 may initiate (at 704) a recordation of the information to distributed ledger 107-1.

As further shown, DLMS 103-1 may receive (at 752) a cross-ledger recordation request from client 305-1, which may indicate that distributed ledger 107-1 is a source distributed ledger and that another distributed ledger 107 (e.g., associated with another DLMS 103) is a target distributed ledger for the cross-ledger recordation request. Based on identifying that the request (at 752) is a cross-ledger recordation request, DLMS 103-1 may forward (at 754) the cross-ledger recordation request to CLG 101-1. That is, in some embodiments, DLMS 103-1 may "locally" handle requests to record information to distributed ledgers 107 (e.g., distributed ledgers 107-1, 107-2, and 107-3) maintained by DLMS 103-1, while DLMS 103-1 may forward cross-ledger recordation requests to CLG 101-1. CLG 101-1 may initiate (at 756) a cross-ledger recordation based on the request from client 305-1, as discussed below with respect to FIG. 9.

FIG. 8 illustrates an example embodiment in which client 305-1 may determine whether to forward recordation requests to DLMS 103-1 or to CLG 101-1. For example, client 305-1 may be configured to determine whether a given ledger recordation request includes a request to record information to a particular distributed ledger 107, or a cross-ledger recordation request with an identification of a source and target distributed ledger 107. For example, client 305-1 may receive instructions (e.g., from a user) via a graphical user interface ("GUI"), via an API, or from some other suitable source to request information to one or more distributed ledgers 107. Client 305-1 may output (at 802) a ledger recordation request to DLMS 103-1, to record information to distributed ledger 107-1. For example, client 305-1 may maintain information indicating that DLMS 103-1 is associated with distributed ledger 107-1, and that ledger recordation requests to distributed ledger 107-1 should accordingly be provided to DLMS 103-1. DLMS 103-1 may accordingly initiate (at 804) a recordation of the information, based on the request (at 802), to distributed ledger 107-1.

As further shown, client 305-1 may output (at 852) a cross-ledger recordation request to CLG 101-1. As discussed above, the cross-ledger recordation request may indicate that distributed ledger 107-1 is a source distributed ledger (and/or that DLMS 103-1 is a source DLMS 103), and client 305-1 may further maintain information indicating that CLG 101-1 is associated with DLMS 103-1. This "association" between CLG 101-1 and DLMS 103-1 may indicate, for example, that cross-ledger recordation requests for which one or more distributed ledgers 107 maintained by DLMS 103-1 should be forwarded to CLG 101-1 (e.g., as opposed to some other device or system). CLG 101-1 may accordingly initiate (at 854) a cross-ledger recordation procedure based on the request (at 852). As similarly noted above, FIG. 9 illustrates an example of such a cross-ledger recordation procedure.

As shown in FIG. 9, CLG 101-1 may receive (at 902) a cross-ledger recordation request specifying that distributed ledger 107-1 is a source distributed ledger 107 (and/or that DLMS 103-1 is a source DLMS 103) and that distributed ledger 107-4 is a target distributed ledger 107 (and/or that DLMS 103-2 is a target DLMS 103). As discussed above, such request may be received (at 652 or 852) from client 305-1, may be received (at 754) from DLMS 103-1, and/or may be received from some other source.

CLG 101-1 may identify that the cross-ledger recordation request is associated with CLG 101-2 (e.g., may select CLG 101 out of a pool of candidate CLGs 101 which may be associated with other DLMSs 103). For example, CLG 101-1 may identify that a target distributed ledger 107 (i.e., distributed ledger 107-4, in this example) is associated with CLG 101-2, may identify that a target DLMS 103 (i.e., DLMS 103-2, in this example) is associated with CLG 101-2, etc. In some embodiments, during the registration procedure (at 106) between CLG 101-1 and CLG 101-2, CLG 101-1 may have received information indicating that CLG 101-2 is associated with distributed ledger 107-4 and/or DLMS 103-2.

Accordingly, CLG 101-1 may forward (at 904) the cross-ledger recordation request, and/or a request that is based on the cross-ledger recordation request, to CLG 101-2. In some embodiments, in conjunction with or prior to forwarding (at 904) the cross-ledger recordation request, CLG 101-1 may provide authentication information to CLG 101-2, based on which CLG 101-2 may authenticate (at 906) the request from CLG 101-1, thus maintaining the security of the communications between CLG 101-1 and CLG 101-2 and preventing unauthorized entities from making such requests.

CLG 101-2 may output (at 908) a recordation request to DLMS 103-2, based on the cross-ledger recordation request (received at 904). The recordation request (at 908) may include an identifier of distributed ledger 107-4, of CLG 101-1, an identifier of distributed ledger 107-1 (e.g., the source distributed ledger 107 associated with the cross-ledger request), an identifier of an initial source of the cross-ledger recordation request (e.g., client 305-1), and/or other suitable information based on which DLMS 103-2 may identify that the recordation request includes a request to record information to distributed ledger 107-4. DLMS 103-2 may accordingly record (at 910) the requested information (e.g., a payload included in the request, metadata associated with the request and/or the recordation to distributed ledger 107-4, etc.) to distributed ledger 107-4.

After the information has been recorded (at 910) to distributed ledger 107-4, DLMS 103-2 may provide (at 912) a confirmation of the recordation to CLG 101-2. For example, once consensus has been reached by nodes 201 that maintain distributed ledger 107-4 and/or other suitable recordation or verification mechanisms have been completed, DLMS 103-2 may determine that the recordation to distributed ledger 107-4 has been confirmed, committed, etc., and may provide confirmation of the recordation to CLG 101-2. Additionally, or alternatively, CLG 101-2 may "listen" to or monitor distributed ledger 107-4, and may identify that the requested recordation (at 910) to distributed ledger 107-4 has been completed. The confirmation (at 912) may include an identifier of one or more records of distributed ledger 107-4 (e.g., an address, a hash, etc.) that include the requested information. Additionally, or alternatively, the confirmation (at 912) may include metadata such as timestamps or other suitable information associated with the recordation (at 910) of the information to distributed ledger 107-4.

CLG 101-2 may forward (at 914) some or all of the confirmation information to CLG 101-1. Based on receiving the confirmation information, CLG 101-1 may output (at 916) a request to record the confirmation that the cross-ledger recordation has been completed. That is, when receiving (at 902) the cross-ledger recordation request, CLG 101-1 may hold the request as "pending" or "not yet committed" until the confirmation (at 914) is received from CLG 101-2. The request (at 916) to record the confirmation may include some or all of the received confirmation information, such as an identifier of DLMS 103-2, an identifier of distributed ledger 107-4, an identifier of one or more records in distributed ledger 107-4 that were created based on the cross-ledger recordation request, some or all of the payload information that was recorded to distributed ledger 107-4, an identifier of client 305-1 (e.g., from which the cross-ledger recordation request was originally received), and/or other suitable information. Based on the request (at 916), DLMS 103-1 may record (at 918) the confirmation information to distributed ledger 107-1.

Figure 10:
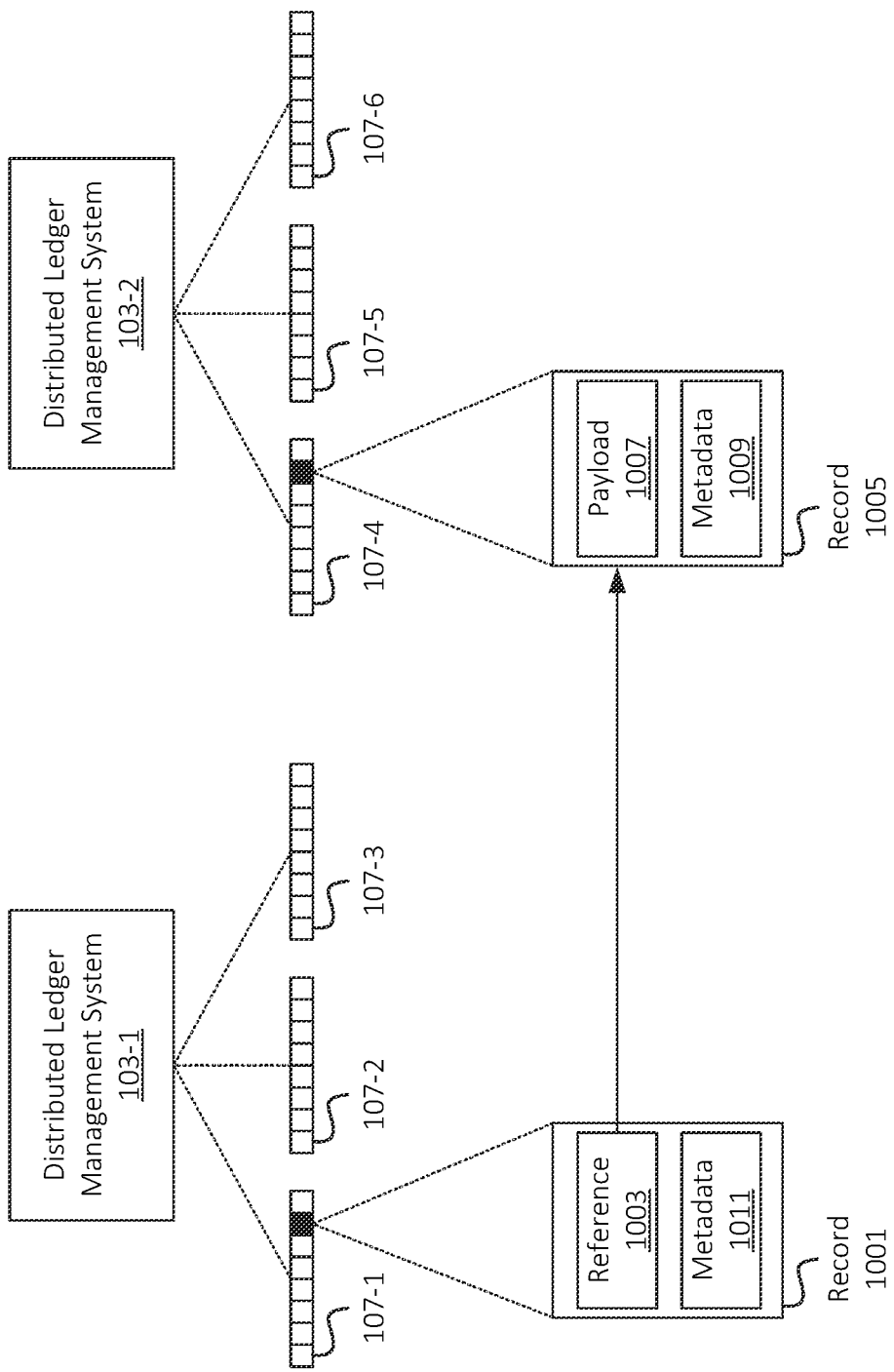
FIG. 10 illustrates example records that may be created on a source distributed ledger and a target distributed ledger based on a cross-ledger recordation procedure, in accordance with some embodiments.

As such, as shown in FIG. 10, a particular record 1001 may be created on distributed ledger 107-1 (e.g., the source distributed ledger 107 of the cross-ledger recordation request) based on the confirmation that the cross-ledger recordation request has been completed. Record 1001 may include reference 1003 to record 1005 on distributed ledger 107-4 (e.g., the target distributed ledger 107 of the cross-ledger recordation request). Reference 1003 may include, for example, an identifier of distributed ledger 107-4, an identifier of DLMS 103-2, an identifier of record 1005 (e.g., an address, a hash, etc.), and/or other suitable information based on which record 1005 may be identified.

As noted above, record 1005 may include information payload 1007, which may include information that was requested to be recorded to distributed ledger 107-4 (e.g., information specified in the cross-ledger recordation request). Record 1005 may also include metadata 1009, which may include a time at which the request was received by DLMS 103-2 and/or one or more other entities, an identifier of a source of the request (e.g., client 305-1, DLMS 103-1, etc.), confirmation or consensus information (e.g., indicating that record 1005 has been confirmed by nodes 201 of DLMS 103-2), and/or other suitable information. Similarly, record 1001 may include metadata 1011, which may include a time at which DLMS 103-1 received confirmation from DLMS 103-2 of the creation of record 1005 and/or other suitable information. In this manner, an entity accessing distributed ledger 107-1 (e.g., client 305-1) may be able to identify, based on reference 1003 included in record 1001, that a cross-ledger recordation request has been completed and that the requested information is included in record 1005 of distributed ledger 107-4. Even in situations where such entity does not have access to view distributed ledger 107-4, the confirmation provided by DLMS 103-2 (e.g., as recorded to record 1001) may serve as verification that the requested information (e.g., information payload 1007) has been recorded to distributed ledger 107-4.

Figure 11:
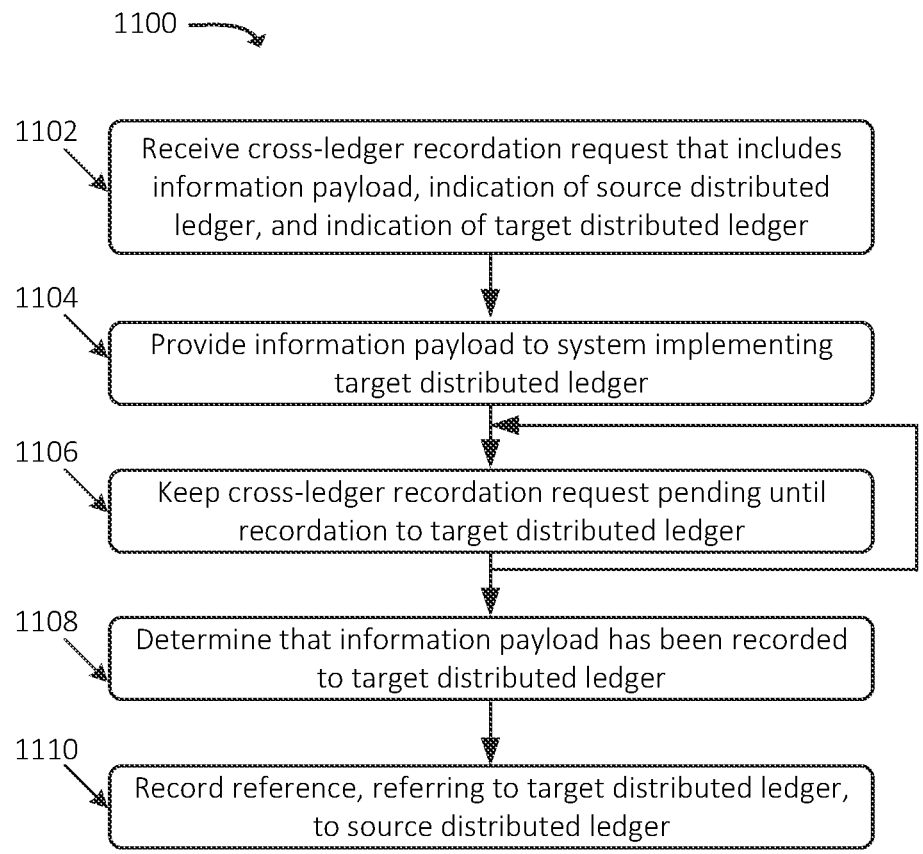
FIG. 11 illustrates an example process for performing a cross-ledger recordation procedure, in accordance with some embodiments.

FIG. 11 illustrates an example process 1100 for performing a cross-ledger recordation, in accordance with some embodiments. In some embodiments, some or all of process 1100 may be performed by a particular CLG 101 (e.g., a particular CLG 101 that is communicatively coupled to a source DLMS 103 or other system that implementations or maintains a source distributed ledger 107). In some embodiments, one or more other devices may perform some or all of process 1100 in concert with, and/or in lieu of, CLG 101.

As shown, process 1100 may include receiving (at 1102) a cross-ledger recordation request. As discussed above, the cross-ledger recordation request may specify a source distributed ledger 107, a target distributed ledger 107, and information payload 1007 (e.g., information to be recorded to the target distributed ledger 107). In some embodiments, as discussed above, CLG 101 may identify another CLG 101 that is associated with the target distributed ledger 107, such as another CLG 101 that is registered with a particular DLMS 103 that maintains or implements the target distributed ledger 107. Additionally, or alternatively, CLG 101 may identify a particular DLMS 103 that maintains or implements the target distributed ledger 107 (e.g., in embodiments where such DLMS 103 routes cross-ledger recordation requests to a respective CLG 101 associated with such DLMS 103 and/or otherwise performs suitable operations to facilitate the cross-ledger recordation request).

Process 1100 may further include providing (at 1104) information payload 1007 to the system implementing the target distributed ledger 107. For example, CLG 101 may provide some or all of information payload 1007 to the identified CLG 101 associated with the target distributed ledger 107 and/or may provide information payload 1007 to an identified DLMS 103 or other suitable device, system, or interface that implements or is otherwise associated with distributed ledger 107. As discussed above, the system receiving information payload 1007 (e.g., a particular CLG 101 associated with the target distributed ledger 107, a particular DLMS 103 associated with the target distributed ledger 107, etc.) may authenticate CLG 101 and/or a request to record information payload 1007 to the target distributed ledger 107, and may record some or all of information payload 1007.

Process 1100 may additionally include keeping (at 1106) the cross-ledger request in a pending state until information payload 1007 has been recorded to the target distributed ledger 107. For example, CLG 101 may forgo recording the cross-ledger request, or any metadata or other information pertaining thereto, to the source distributed ledger 107 before receiving confirmation or otherwise determining that information payload 1007 has been recorded to the target distributed ledger 107.

Process 1100 may also include determining (at 1108) that information payload 1007 has been recorded to the target distributed ledger 107. For example, CLG 101 may receive a confirmation from a particular CLG 101 and/or DLMS 103 that is associated with the target distributed ledger 107, and/or may otherwise determine that some or all of information payload 1007 has been recorded to the target distributed ledger 107. In some embodiments, CLG 101 may identify an address, a block, a hash, a link, and/or other suitable reference to one or more records, of the target distributed ledger 107, that include some or all of information payload 1007.

Process 1100 may further include recording (at 1110) the reference, referring to the target distributed ledger 107, to the source distributed ledger 107. For example, as discussed above, CLG 101 may record the address, block, hash, etc. of one or more records of the target distributed ledger 107 that include some or all of information payload 1007, to the source distributed ledger 107. In this manner, an entity that has access to the source distributed ledger 107 may be readily able to ascertain that the cross-ledger recordation request has been completed. Further, in situations where such entity also has access to the target distributed ledger 107, such entity may be able to view the record(s) of the target distributed ledger 107 that include the requested information payload 1007. On the other hand, in situations where such entity does not have access to the target distributed ledger 107, such entity may be assured that the requested information payload 1007 has been recorded to the target distributed ledger 107, based on the association between CLG 101 and the target distributed ledger 107 (e.g., the association between CLG 101 of the source distributed ledger 107, and CLG 101 or DLMS 103 of the target distributed ledger 107).

Figure 12:
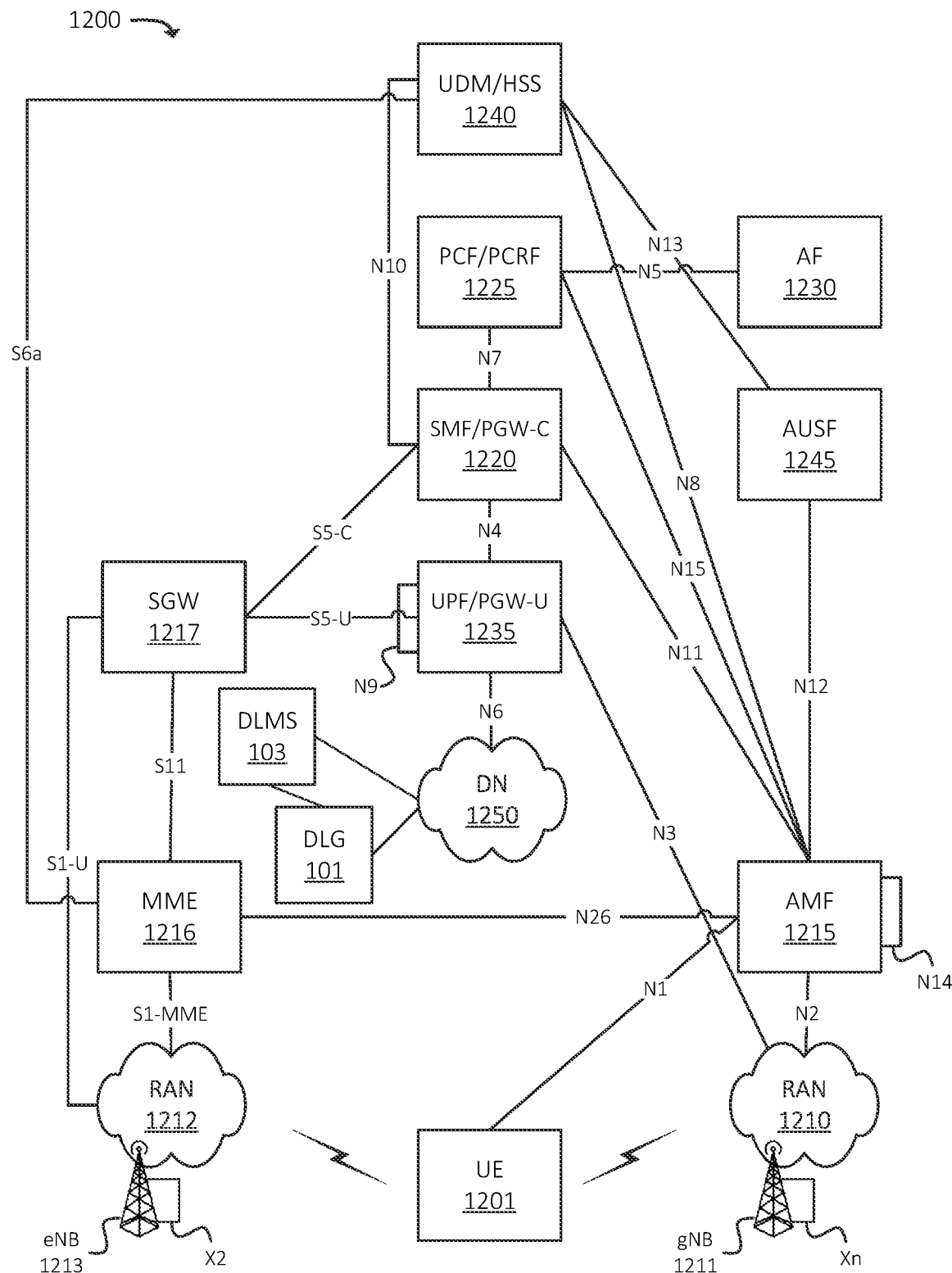
FIG. 12 illustrates an example environment in which one or more embodiments, described herein, may be implemented.

FIG. 12 illustrates an example environment 1200, in which one or more embodiments may be implemented. In some embodiments, environment 1200 may correspond to a Fifth Generation ("5G") network, and/or may include elements of a 5G network. In some embodiments, environment 1200 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 1200 may represent or may include a 5G core ("5GC"). As shown, environment 1200 may include UE 1201, RAN 1210 (which may include one or more Next Generation Node Bs ("gNBs") 1211), RAN 1212 (which may include one or more evolved Node Bs ("eNBs") 1213), and various network functions such as Access and Mobility Management Function ("AMF") 1215, Mobility Management Entity ("MME") 1216, Serving Gateway ("SGW") 1217. Session Management Function ("SMF")/Packet Data Network ("PDN") Gateway ("PGW")-Control plane function ("PGW-C") 1220, Policy Control Function ("PCF")/Policy Charging and Rules Function ("PCRF") 1225, Application Function ("AF") 1230, User Plane Function ("UPF")/PGW-User plane function ("PGW-U") 1235, Unified Data Management ("UDM")/Home Subscriber Server ("HSS") 1240, and Authentication Server Function ("AUSF") 1245. Environment 1200 may also include one or more networks, such as Data Network ("DN") 1250. Environment 1200 may include one or more additional devices or systems communicatively coupled to one or more networks (e.g., DN 1250), such as CLG 101 and/or DLMS 103.

The example shown in FIG. 12 illustrates one instance of each network component or function (e.g., one instance of SMF/PGW-C 1220, PCF/PCRF 1225, UPF/PGW-U 1235, UDM/HSS 1240, and/or AUSF 1245). In practice, environment 1200 may include multiple instances of such components or functions. For example, in some embodiments, environment 1200 may include multiple "slices" of a core network, where each slice includes a discrete and/or logical set of network functions (e.g., one slice may include a first instance of SMF/PGW-C 1220, PCF/PCRF 1225, UPF/PGW-U 1235, UDM/HSS 1240, and/or AUSF 1245, while another slice may include a second instance of SMF/PGW-C 1220, PCF/PCRF 1225, UPF/PGW-U 1235, UDM/HSS 1240, and/or AUSF 1245). The different slices may provide differentiated levels of service, such as service in accordance with different Quality of Service ("QoS") parameters.

The quantity of devices and/or networks, illustrated in FIG. 12, is provided for explanatory purposes only. In practice, environment 1200 may include additional devices and/or networks, fewer devices and/or networks, different devices and/or networks, or differently arranged devices and/or networks than illustrated in FIG. 12. For example, while not shown, environment 1200 may include devices that facilitate or enable communication between various components shown in environment 1200, such as routers, modems, gateways, switches, hubs, etc. In some implementations, one or more devices of environment 1200 may be physically integrated in, and/or may be physically attached to, one or more other devices of environment 1200. Alternatively, or additionally, one or more of the devices of environment 1200 may perform one or more network functions described as being performed by another one or more of the devices of environment 1200.

Elements of environment 1200 may interconnect with each other and/or other devices via wired connections, wireless connections, or a combination of wired and wireless connections. Examples of interfaces or communication pathways between the elements of environment 1200, as shown in FIG. 12, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 12, such as Service-Based Interfaces ("SBIs"), including an Namf interface, an Nudm interface, an Npcf interface, an Nupf interface, an Nnef interface, an Nsmf interface, and/or one or more other SBIs.

UE 1201 may include a computation and communication device, such as a wireless mobile communication device that is capable of communicating with RAN 1210, RAN 1212, and/or DN 1250. UE 1201 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 1201 may send traffic to and/or receive traffic (e.g., user plane traffic) from DN 1250 via RAN 1210, RAN 1212, and/or UPF/PGW-U 1235. In some embodiments, UE 1201 may include, may implement, and/or may be communicatively coupled to one or more nodes 201, DLMS 103, and/or CLG 101.

RAN 1210 may be, or may include, a 5G RAN that includes one or more base stations (e.g., one or more gNBs 1211), via which UE 1201 may communicate with one or more other elements of environment 1200. UE 1201 may communicate with RAN 1210 via an air interface (e.g., as provided by gNB 1211). For instance, RAN 1210 may receive traffic (e.g., user plane traffic such as voice call traffic, data traffic, messaging traffic, etc.) from UE 1201 via the air interface, and may communicate the traffic to UPF/PGW-U 1235 and/or one or more other devices or networks.

Further, RAN 1210 may receive signaling traffic, control plane traffic, etc. from UE 1201 via the air interface, and may communicate such signaling traffic, control plane traffic, etc. to AMF 1215 and/or one or more other devices or networks. Additionally, RAN 1210 may receive traffic intended for UE 1201 (e.g., from UPF/PGW-U 1235, AMF 1215, and/or one or more other devices or networks) and may communicate the traffic to UE 1201 via the air interface.

RAN 1212 may be, or may include, a LTE RAN that includes one or more base stations (e.g., one or more eNBs 1213), via which UE 1201 may communicate with one or more other elements of environment 1200. UE 1201 may communicate with RAN 1212 via an air interface (e.g., as provided by eNB 1213). For instance, RAN 1212 may receive traffic (e.g., user plane traffic such as voice call traffic, data traffic, messaging traffic, signaling traffic, etc.) from UE 1201 via the air interface, and may communicate the traffic to UPF/PGW-U 1235 (e.g., via SGW 1217) and/or one or more other devices or networks. Further, RAN 1212 may receive signaling traffic, control plane traffic, etc. from UE 1201 via the air interface, and may communicate such signaling traffic, control plane traffic, etc. to MME 1216 and/or one or more other devices or networks. Additionally, RAN 1212 may receive traffic intended for UE 1201 (e.g., from UPF/PGW-U 1235, MME 1216, SGW 1217, and/or one or more other devices or networks) and may communicate the traffic to UE 1201 via the air interface.

AMF 1215 may include one or more devices, systems, Virtualized Network Functions ("VNFs"), Cloud-Native Network Functions ("CNFs"), etc., that perform operations to register UE 1201 with the 5G network, to establish bearer channels associated with a session with UE 1201, to hand off UE 1201 from the 5G network to another network, to hand off UE 1201 from the other network to the 5G network, manage mobility of UE 1201 between RANs 1210 and/or gNBs 1211, and/or to perform other operations. In some embodiments, the 5G network may include multiple AMFs 1215, which communicate with each other via the N14 interface (denoted in FIG. 12 by the line marked "N14" originating and terminating at AMF 1215).

MME 1216 may include one or more devices, systems, VNFs, CNFs, etc., that perform operations to register UE 1201 with the EPC, to establish bearer channels associated with a session with UE 1201, to hand off UE 1201 from the EPC to another network, to hand off UE 1201 from another network to the EPC, manage mobility of UE 1201 between RANs 1212 and/or eNBs 1213, and/or to perform other operations.

SGW 1217 may include one or more devices, systems, VNFs, CNFs, etc., that aggregate traffic received from one or more eNBs 1213 and send the aggregated traffic to an external network or device via UPF/PGW-U 1235. Additionally, SGW 1217 may aggregate traffic received from one or more UPF/PGW-Us 1235 and may send the aggregated traffic to one or more eNBs 1213. SGW 1217 may operate as an anchor for the user plane during inter-eNB handovers and as an anchor for mobility between different telecommunication networks or RANs (e.g., RANs 1210 and 1212).

SMF/PGW-C 1220 may include one or more devices, systems, VNFs, CNFs, etc., that gather, process, store, and/or provide information in a manner described herein. SMF/PGW-C 1220 may, for example, facilitate the establishment of communication sessions on behalf of UE 1201. In some embodiments, the establishment of communications sessions may be performed in accordance with one or more policies provided by PCF/PCRF 1225.

PCF/PCRF 1225 may include one or more devices, systems, VNFs, CNFs, etc., that aggregate information to and from the 5G network and/or other sources. PCF/PCRF 1225 may receive information regarding policies and/or subscriptions from one or more sources, such as subscriber databases and/or from one or more users (such as, for example, an administrator associated with PCF/PCRF 1225).

AF 1230 may include one or more devices, systems, VNFs, CNFs, etc., that receive, store, and/or provide information that may be used in determining parameters (e.g., quality of service parameters, charging parameters, or the like) for certain applications.

UPF/PGW-U 1235 may include one or more devices, systems, VNFs, CNFs, etc., that receive, store, and/or provide data (e.g., user plane data). For example, UPF/PGW-U 1235 may receive user plane data (e.g., voice call traffic, data traffic, etc.), destined for UE 1201, from DN 1250, and may forward the user plane data toward UE 1201 (e.g., via RAN 1210, SMF/PGW-C 1220, and/or one or more other devices). In some embodiments, multiple UPFs 1235 may be deployed (e.g., in different geographical locations), and the delivery of content to UE 1201 may be coordinated via the N9 interface (e.g., as denoted in FIG. 12 by the line marked "N9" originating and terminating at UPF/PGW-U 1235). Similarly, UPF/PGW-U 1235 may receive traffic from UE 1201 (e.g., via RAN 1210, RAN 1212, SMF/PGW-C 1220, and/or one or more other devices), and may forward the traffic toward DN 1250. In some embodiments, UPF/PGW-U 1235 may communicate (e.g., via the N4 interface) with SMF/PGW-C 1220, regarding user plane data processed by UPF/PGW-U 1235.

UDM/HSS 1240 and AUSF 1245 may include one or more devices, systems, VNFs, CNFs, etc., that manage, update, and/or store, in one or more memory devices associated with AUSF 1245 and/or UDM/HSS 1240, profile information associated with a subscriber. AUSF 1245 and/or UDM/HSS 1240 may perform authentication, authorization, and/or accounting operations associated with the subscriber and/or a communication session with UE 1201.

DN 1250 may include one or more wired and/or wireless networks. For example, DN 1250 may include an Internet Protocol ("IP")-based PDN, a wide area network ("WAN") such as the Internet, a private enterprise network, and/or one or more other networks. UE 1201 may communicate, through DN 1250, with data servers, other UEs 1201, and/or to other servers or applications that are coupled to DN 1250. DN 1250 may be connected to one or more other networks, such as a public switched telephone network ("PSTN"), a public land mobile network ("PLMN"), and/or another network. DN 1250 may be connected to one or more devices, such as content providers, applications, web servers, and/or other devices, with which UE 1201 may communicate.

Figure 13:
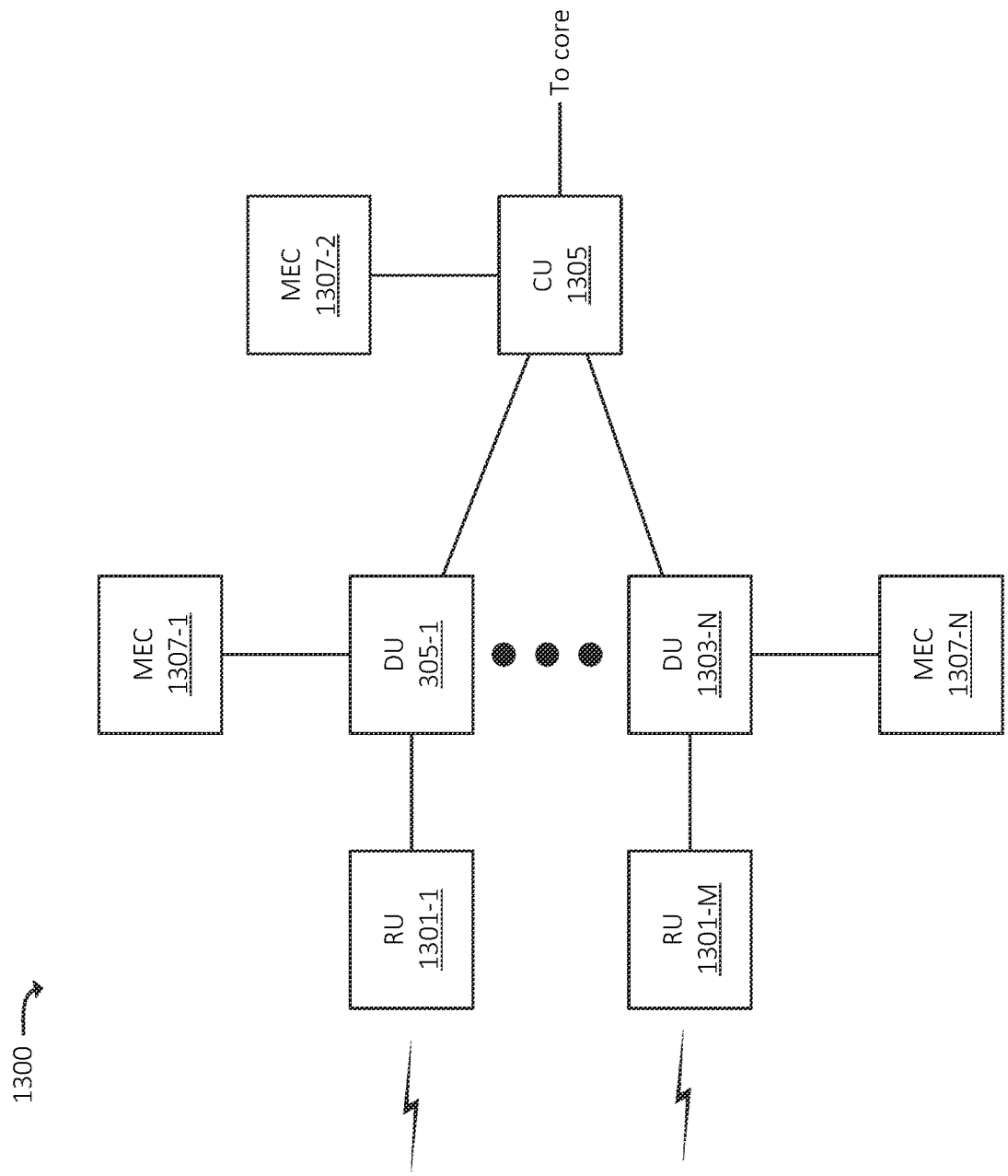
FIG. 13 illustrates an example arrangement of a radio access network ("RAN"), in accordance with some embodiments.

FIG. 13 illustrates an example RAN environment 1300, which may be included in and/or implemented by one or more RANs (e.g., RAN 1210, RAN 1212, or some other RAN). In some embodiments, a particular RAN may include one RAN environment 1300. In some embodiments, a particular RAN may include multiple RAN environments 1300. In some embodiments, RAN environment 1300 may correspond to a particular gNB 1211 of a 5G RAN (e.g., RAN 1210). In some embodiments, RAN environment 1300 may correspond to multiple gNBs 1211. In some embodiments, RAN environment 1300 may correspond to one or more other types of base stations of one or more other types of RANs. As shown, RAN environment 1300 may include Central Unit ("CU") 1305, one or more Distributed Units ("DUs") 1303-1 through 1303-N (referred to individually as "DU 1303," or collectively as "DUs 1303"), and one or more Radio Units ("RUs") 1301-1 through 1301-M (referred to individually as "RU 1301," or collectively as "RUs 1301").

CU 1305 may communicate with a core of a wireless network (e.g., may communicate with one or more of the devices or systems described above with respect to FIG. 12, such as AMF 1215 and/or UPF/PGW-U 1235). In the uplink direction (e.g., for traffic from UEs 1201 to a core network), CU 1305 may aggregate traffic from DUs 1303, and forward the aggregated traffic to the core network. In some embodiments, CU 1305 may receive traffic according to a given protocol (e.g., Radio Link Control ("RLC")) from DUs 1303, and may perform higher-layer processing (e.g., may aggregate/process RLC packets and generate Packet Data Convergence Protocol ("PDCP") packets based on the RLC packets) on the traffic received from DUs 1303.

In accordance with some embodiments, CU 1305 may receive downlink traffic (e.g., traffic from the core network) for a particular UE 1201, and may determine which DU(s) 1303 should receive the downlink traffic. DU 1303 may include one or more devices that transmit traffic between a core network (e.g., via CU 1305) and UE 1201 (e.g., via a respective RU 1301). DU 1303 may, for example, receive traffic from RU 1301 at a first layer (e.g., physical ("PHY") layer traffic, or lower PHY layer traffic), and may process/aggregate the traffic to a second layer (e.g., upper PHY and/or RLC). DU 1303 may receive traffic from CU 1305 at the second layer, may process the traffic to the first layer, and provide the processed traffic to a respective RU 1301 for transmission to UE 1201.

RU 1301 may include hardware circuitry (e.g., one or more RF transceivers, antennas, radios, and/or other suitable hardware) to communicate wirelessly (e.g., via an RF interface) with one or more UEs 1201, one or more other DUs 1303 (e.g., via RUs 1301 associated with DUs 1303), and/or any other suitable type of device. In the uplink direction, RU 1301 may receive traffic from UE 1201 and/or another DU 1303 via the RF interface and may provide the traffic to DU 1303. In the downlink direction, RU 1301 may receive traffic from DU 1303, and may provide the traffic to UE 1201 and/or another DU 1303.

One or more elements of RAN environment 1300 may, in some embodiments, be communicatively coupled to one or more Multi-Access/Mobile Edge Computing ("MEC") devices, referred to sometimes herein simply as "MECs" 1307. For example, DU 1303-1 may be communicatively coupled to MEC 1307-1, DU 1303-N may be communicatively coupled to MEC 1307-N, CU 1305 may be communicatively coupled to MEC 1307-2, and so on. MECs 1307 may include hardware resources (e.g., configurable or provisionable hardware resources) that may be configured to provide services and/or otherwise process traffic to and/or from UE 1201, via a respective RU 1301.

For example, DU 1303-1 may route some traffic, from UE 1201, to MEC 1307-1 instead of to a core network via CU 1305. MEC 1307-1 may process the traffic, perform one or more computations based on the received traffic, and may provide traffic to UE 1201 via RU 1301-1. In some embodiments, MEC 1307 may include, and/or may implement, some or all of the functionality described above with respect to node 201, CLG 101, DLMS 103, AF 1230, UPF 1235, and/or one or more other devices, systems, VNFs, CNFs, etc. In this manner, ultra-low latency services may be provided to UE 1201, as traffic does not need to traverse DU 1303, CU 1305, links between DU 1303 and CU 1305, and an intervening backhaul network between RAN environment 1300 and the core network.

Figure 14:
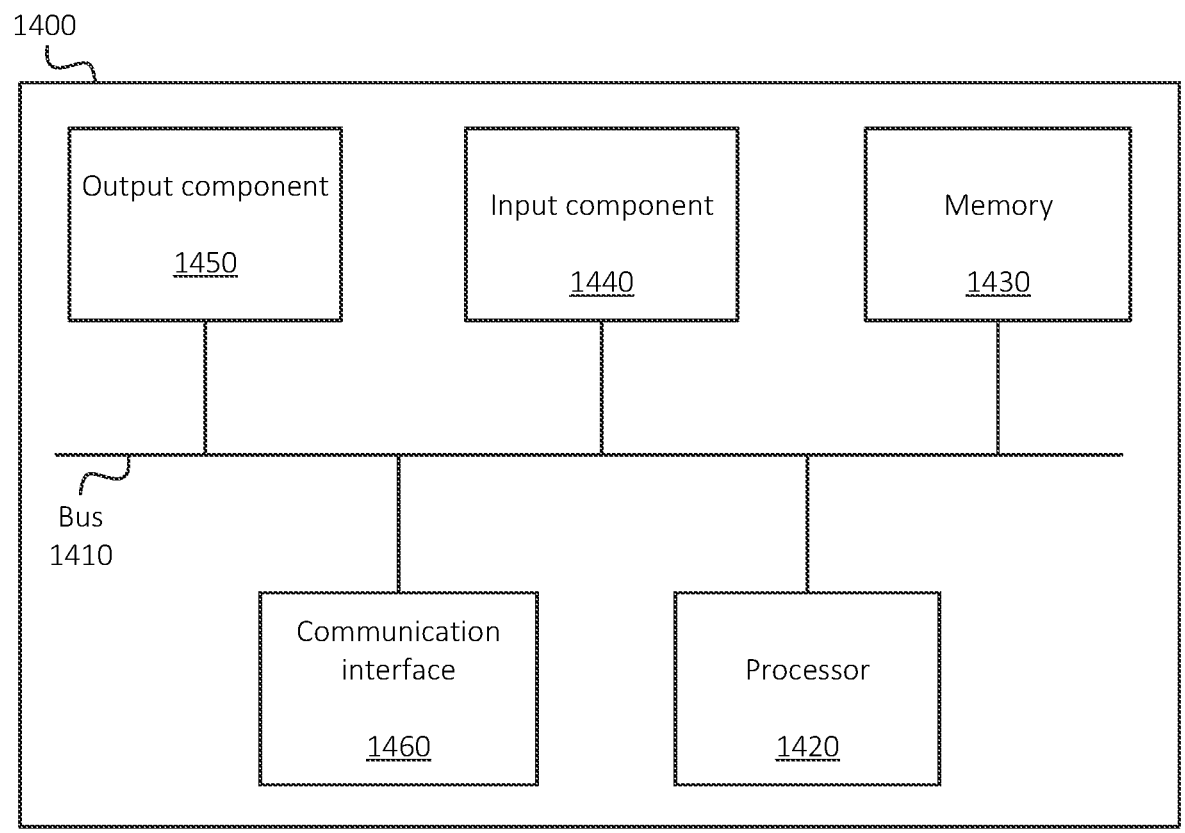
FIG. 14 illustrates example components of one or more devices, in accordance with one or more embodiments described herein.

FIG. 14 illustrates example components of device 1400. One or more of the devices described above may include one or more devices 1400. Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, or processing logic that may interpret and execute instructions. In some embodiments, processor 1420 may be or may include one or more hardware processors. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400 and/or other receives or detects input from a source external to input component 1440, such as a touchpad, a touchscreen, a keyboard, a keypad, a button, a switch, a microphone or other audio input component, etc. In some embodiments, input component 1440 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1450 may include a mechanism that outputs information to the operator, such as a display, a speaker, one or more light emitting diodes ("LEDs"), etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations relating to one or more processes described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-11), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   receive, from a client device, a cross-ledger recordation request that includes:
      an information payload,
      a first indication of a first distributed ledger to which the information payload should be recorded, and
      a second indication of a second distributed ledger to which a reference that refers to the first distributed ledger should be recorded;
   provide the information payload and an identifier of the client device from which the cross-ledger recordation request was received to a system that implements the first distributed ledger, wherein the system records a first record to the first distributed ledger, wherein the first record is associated with a particular address and wherein the first record includes:
      the identifier of the client device from which the cross-ledger recordation request was received, and
      the information payload included in the cross-ledger recordation request;
   monitor the first distributed ledger after providing the information payload to the system that implements the first distributed ledger;
   determine, based on monitoring the first distributed ledger, that the information payload has been recorded to the first distributed ledger, wherein determining that the information payload has been recorded to the first distributed ledger includes identifying the first record that has been recorded to the first ledger; and
   based on determining that the information payload has been recorded to the first distributed ledger and further based on the second indication included in the cross-ledger recordation request, record a second record to the second distributed ledger, wherein the second record includes:
      an identifier of the first distributed ledger, and
      the particular address of the first record that was recorded to the first distributed ledger in response to the cross-ledger recordation request.

2. The device of claim 1, wherein the second record is not recorded to the second distributed ledger prior to determining that the information payload has been recorded to the first distributed ledger.

3. The device of claim 1, wherein the one or more processors are further configured to:
   establish one or more authentication procedures with the system that implements the first distributed ledger, wherein the system utilizes the one or more authentication procedures to authenticate the device based on receiving the information payload from the device.

4. The device of claim 1, wherein the system includes a first system that implements the first distributed ledger implements a first distributed ledger framework, and wherein the device is communicatively coupled to a second system that implements a second distributed ledger framework.

5. The device of claim 4, wherein recording the second record to the second distributed ledger includes providing the identifier of the first distributed ledger to the second distributed ledger framework.

6. The device of claim 1, wherein the information payload is a first information payload, wherein the one or more processors are further configured to:
receive a request to record a second information payload to the second distributed ledger; and
record the second information payload to the second distributed ledger without providing the second information payload to the system that implements the first distributed ledger.

7. A method, comprising:
receiving, from a client device, a cross-ledger recordation request that includes:
an information payload,
a first indication of a first distributed ledger to which the information payload should be recorded, and
a second indication of a second distributed ledger to which a reference that refers to the first distributed ledger should be recorded;
providing the information payload and an identifier of the client device from which the cross-ledger recordation request was received to a system that implements the first distributed ledger, wherein the system records a first record to the first distributed ledger, wherein the first record is associated with a particular address and wherein the first record includes:
the identifier of the client device from which the cross-ledger recordation request was received, and
the information payload included in the cross-ledger recordation request;
monitoring the first distributed ledger after providing the information payload to the system that implements the first distributed ledger;
determining, based on monitoring the first distributed ledger, that the information payload has been recorded to the first distributed ledger, wherein determining that the information payload has been recorded to the first distributed ledger includes identifying the first record that has been recorded to the first ledger; and
based on determining that the information payload has been recorded to the first distributed ledger and further based on the second indication included in the cross-ledger recordation request, recording a second record to the second distributed ledger, wherein the second record includes:
an identifier of the first distributed ledger, and
the particular address of the first record that was recorded to the first distributed ledger in response to the cross-ledger recordation request.

8. A non-transitory computer-readable medium, storing a plurality of processor-executable instructions to:
receive, from a client device, a cross-ledger recordation request that includes:
an information payload,
a first indication of a first distributed ledger to which the information payload should be recorded, and
a second indication of a second distributed ledger to which a reference that refers to the first distributed ledger should be recorded;
provide the information payload and an identifier of the client device from which the cross-ledger recordation request was received to a system that implements the first distributed ledger, wherein the system records a first record to the first distributed ledger, wherein the first record is associated with a particular address and wherein the first record includes:
the identifier of the client device from which the cross-ledger recordation request was received, and
the information payload included in the cross-ledger recordation request;
monitor the first distributed ledger after providing the information payload to the system that implements the first distributed ledger;
determine, based on monitoring the first distributed ledger, that the information payload has been recorded to the first distributed ledger, wherein determining that the information payload has been recorded to the first distributed ledger includes identifying the first record that has been recorded to the first ledger; and
based on determining that the information payload has been recorded to the first distributed ledger and further based on the second indication included in the cross-ledger recordation request, record a second record to the second distributed ledger, wherein the second record includes:
an identifier of the first distributed ledger, and
the particular address of the first record that was recorded to the first distributed ledger in response to the cross-ledger recordation request.

9. The non-transitory computer-readable medium of claim 8, wherein the second record is not recorded to the second distributed ledger prior to determining that the information payload has been recorded to the first distributed ledger.

10. The non-transitory computer-readable medium of claim 8, wherein the plurality of processor-executable instructions further include processor-executable instructions to:
establish one or more authentication procedures with the system that implements the first distributed ledger, wherein the system utilizes the one or more authentication procedures based on receiving the information payload.

11. The non-transitory computer-readable medium of claim 8, wherein the system includes a first system that implements the first distributed ledger implements a first distributed ledger framework, and wherein a device that executes the plurality of processor-executable instructions is communicatively coupled to a second system that implements a second distributed ledger framework.

12. The non-transitory computer-readable medium of claim 11, wherein recording the second record to the second distributed ledger includes providing the identifier of the first distributed ledger to the second distributed ledger framework.

13. The non-transitory computer-readable medium of claim 8, wherein the information payload is a first information payload, wherein the plurality of processor-executable instructions further include processor-executable instructions to:
receive a request to record a second information payload to the second distributed ledger; and record the second information payload to the second distributed ledger without providing the second information payload to the system that implements the first distributed ledger.

14. The device of claim 1, wherein providing the information payload to the system that implements the first distributed ledger includes providing the information payload to a distributed ledger management system associated with the first distributed ledger.

15. The method of claim 7, wherein providing the information payload to the system that implements the first distributed ledger includes providing the information payload to a distributed ledger management system associated with the first distributed ledger.

16. The method of claim 7, wherein the second record is not recorded to the second distributed ledger prior to determining that the information payload has been recorded to the first distributed ledger.

17. The method of claim 7, further comprising:
establishing one or more authentication procedures with the system that implements the first distributed ledger, wherein the system utilizes the one or more authentication procedures based on receiving the information payload.

18. The method of claim 7,
wherein the system includes a first system that implements the first distributed ledger implements a first distributed ledger framework, and wherein a device that performs the method is communicatively coupled to a second system that implements a second distributed ledger framework, and
wherein recording the reference, that refers to the first distributed ledger, to the second distributed ledger includes providing the identifier of the first distributed ledger to the second distributed ledger framework.

19. The method of claim 7, wherein the information payload is a first information payload, the method further comprising:
receiving a request to record a second information payload to the second distributed ledger; and
recording the second information payload to the second distributed ledger without providing the second information payload to the system that implements the first distributed ledger.

20. The non-transitory computer-readable medium of claim 8, wherein providing the information payload to the system that implements the first distributed ledger includes providing the information payload to a distributed ledger management system associated with the first distributed ledger.

* * * * *